May 7, 1963   R. H. CARLSON   3,088,140
METHOD OF FORMING BLANKS WITH INTERNAL AND
EXTERNAL TORQUE ENGAGING MEANS
Filed Jan. 26, 1959

INVENTOR.
RAYMOND H. CARLSON
BY
BUCKHORN, CHEATHAM & BLORE
ATTORNEYS

United States Patent Office 3,088,140
Patented May 7, 1963

3,088,140
METHOD OF FORMING BLANKS WITH INTERNAL AND EXTERNAL TORQUE ENGAGING MEANS
Raymond H. Carlson, Rockford, Ill., assignor to Textron Industries, Inc., Rockford, Ill., a corporation of Delaware
Filed Jan. 26, 1959, Ser. No. 788,832
2 Claims. (Cl. 10—27)

The present invention relates to metal forming and more particularly to the method of manufacture of a headed article having a plurality of of wrench receiving serrations on the exterior surface of the head thereof and a polygonal tool receiving recess within the head.

Heretofore, articles with the manufacture of which this invention is concerned, were generally manufactured by upsetting stock of relatively small diameter to provide a mass of material from which the head could be formed. However, upsetting of the head stock caused a work hardening of the metal so that further shaping could only be accomplished by expensive machining processes. The head recess, for example, was formed by first drilling the head and thereafter broaching the flats therein. This, it will be recognized, is costly and time consuming and, moreover, presents a difficult indexing problem if the interior recess is to be oriented with respect to the exterior serrations.

It is, therefore, an object of the present invention to provide a new and improved process for manufacturing headed articles of the type described.

More particularly, it is an object of the present invention to provide a process to enable the manufacture of headed articles of the type described at lower cost than heretofore possible.

Still another object of the present invention is to provide a process for making headed articles of the class described wherein the finished article will have a maximum of strength.

Other objects and advantages of the present invention will become more apparent hereinafter.

In accordance with the illustrated embodiment of the present invention, a cylindrical workpiece is first extruded to provide a shank portion of substantially the desired diameter of the finished product and a substantially unworked head portion. The head portion is then worked to extrude thereon a plurality of serrations on its periphery. Without moving the workpiece from the holding die in which the last described step is performed, the head part is encompassed in a further die having serrations matching those of the head and the head of the die simultaneously struck with a punch to form therein the recess desired in the finished article, the recess corners being in a predetermined alignment with the serrations of the die which encompasses the head.

For a more detailed description of the invention, reference is made to the following specification and accompanying drawings wherein.

Figure 4:
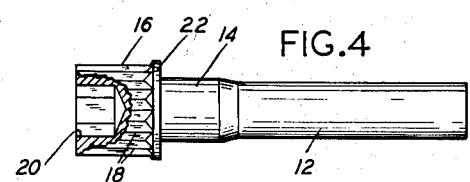
FIG. 4 is a side elevation, partially in section, of the article after completion of the extrusion and heading operations, but prior to the formation of threads on the shank thereof.
Figure 5:
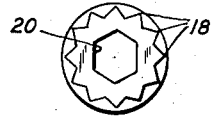
FIG. 5 is an end view of the head of the finished article.

Referring now to the drawings and first more particularly to FIGS. 4 and 5, the hex socket, twelve-point head screw blank 10 manufactured by the method of the present invention comprises an elongated shank including a thread portion 12 upon which threads may be formed by rolling or other suitable process and a larger intermediate connecting portion 14 adjacent the head 16 of the screw. The head 16 is serrated about its exterior surface to provide twelve wrench engaging points 18 positioned equiangularly about the circumference of the head. Punched in the head 16 is a hexagonal socket 20 which is so positioned in the head that the corners of the socket are lined up radially with points of the serrations 18. This configuration provides maintenance of maximum wall thickness in the head so as to assure that the product has maximum strength. The end of the head 16 adjacent the shank is provided with a flange 22 defining in effect an integral washer.

Figure 2:
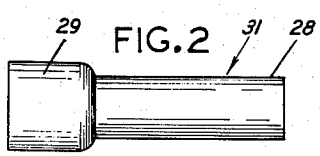
FIG. 2 is a side elevation showing the blank after the first step of the forming operation.
Figure 6:
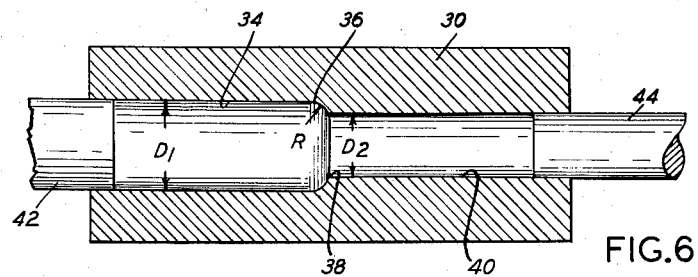
FIG. 6 is a sectional view of dies utilized in the initial extrusion step.
Figure 7:
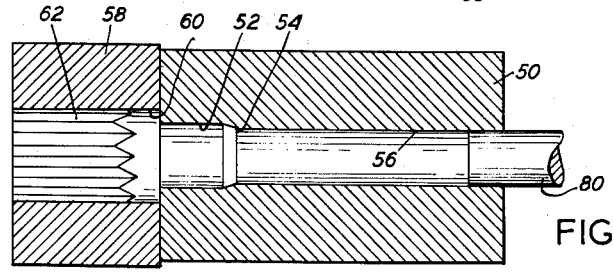
FIG. 7 is a sectional view of the dies utilized in the first head forming stage.
Figure 8:
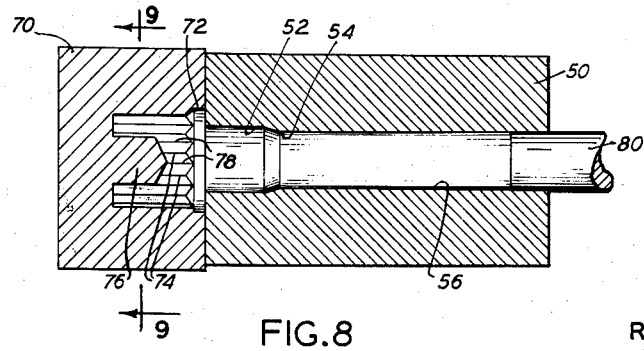
FIG. 8 is a sectional view of the die utilized in the final head forming operation.

In accordance with the method of the invention, the screw blank 10 is manufactured by first providing a cylindrical workpiece 26 which may be severed from wire or rod stock and which has an initial diameter substantially equal to the diameter across the points of the serrations 18 and a volume substantially equal to that of the finished screw. The workpiece 26 is first positioned within an extrusion die 30 illustrated in FIG. 6 and a predetermined portion of the workpiece extruded to provide a blank 31, such as shown in FIG. 2, having a substantially unworked head part 29 and an elongated shank 28 having a diameter substantially equal to the diameter of the intermediate shank portion 14 and a volume substantially equal to that of the combined volumes of the thread portion 12 and the intermediate shank portion 14. Preferably, the extrusion is carried out in an extrusion die having a cavity comprising a cylindrical wall portion 34 of a diameter just slightly greater than that of the workpiece 26 and of a length slightly greater than that of the workpiece. The inner end of the gravity 34 converges to define a concave material contacting surface 36 which is tangential to the wall portion 34 and extends between the wall portion 34 and a circular extrusion orifice 38 of the diameter desired for the shank 28. As explained in my copending application, Serial No. 788,833, filed January 26, 1959, the surface 36 preferably has a radius of curvature R no greater than the difference between the diameter $D_1$ of the cavity portion 34 and the diameter $D_2$ of the orifice 38 and no less than one-half the difference between these diameters or no less than $$\frac{D_1-D_2}{2}$$

The wall defining the orifice 38 is cylindrical and also defines a receiving cavity 40 into which the shank 28 may proceed after its extrusion.

The workpiece 26 is forced through the extrusion orifice 38 by suitable means including an extrusion punch 42 which is retracted after the desired shank 28 has been extruded to permit the blank 31 to be removed from the die by a conventional knock-out pin 44.

The blank 31 after removal from the die 30 is moved to a holding die 50 having a cavity including an outer portion 52 of the diameter and length of the intermediate shank portion 14. The inner end of the outer gravity portion 52 tapers to an extrusion orifice 54 of the diameter of the thread portion 12 of the screw shank, the die being also provided with a receiving cavity 56 into which the shank portion 12 may proceed from the orifice 54. As will be apparent, only the end portion of shank 28 may initially be inserted into the holding die 50 since the reduced diameter of the orifice 54 will prevent full insertion. After the end of the shank 28 is inserted into the die cavity 52 the head 29 of the blank is engaged with an extrusion die 58 which is advanced by suitable means toward the holding die 50. The die 58 is provided with a cavity including a cylindrical entrance portion 60 of slightly larger diameter than the head 29 so as to encompass the end thereof and is formed with twelve wrench engaging serrations 62 on the wall thereof inwardly of the entrance substantially completary to the serrations 18 of the screw 10.

Figure 1:
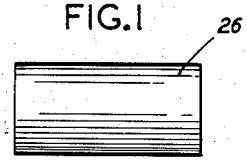
FIG. 1 is a side elevation of the blank utilized in making articles in accordance with the method of the invention.
Figure 3:
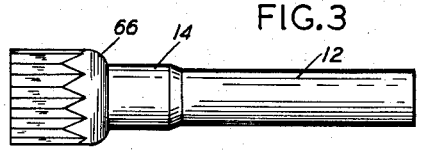
FIG. 3 is a side elevation showing the blank after a succeeding step in the formation of the article by the method of the invention.

As the die 58 is advanced toward the holding die 50, the die 58 will advance over the head 29 to extrude the same and shape serrations thereon so that the head will assume the shape indicated in FIG. 3 at 66. Simultaneously, the shank 28 will be forced into the die 50 so as to extrude the shank through the orifice 54 thus forming the shank into the thread part 12 and intermediate portion 14.

Upon completion of this step, the die 58 is retracted from the workpiece and without disturbing the position of the workpiece, a punching and heading die 70 is next advanced over the head part 66. It will be apparent that extrusion of the shank 28 will cause a certain amount of swelling of the shank portion 14 and tightening of the workpiece in the die 50. The frictional force upon the workpiece shank may, therefore, be sufficient to retain the workpiece securely within the die 50 while the die 58 is retracted. However, the die 58 may be provided with a conventional knock-out pin (not shown) to engage the workpiece and prevent any movement thereof while the die 58 is retracted.

Figure 9:
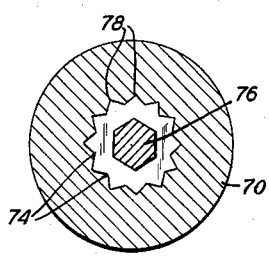
FIG. 9 is a sectional view taken along line 9—9 of FIG. 8.

The die 70 is provided with a cylindrical recess 72 adjacent its surface complementary the flange 22 and with a serrated side wall portion 74 complementary to the serrated portion of the head 16. The die 70 is accurately aligned by means not shown so that as the die is advanced over the head part 66, the serrations 74 of the die mesh with those on the head part 66. Positioned centrally of the die cavity is an hexagonal punch 76 complementary to the screw socket 20. The punch is positioned with its corners in diametric alignment with roots 78 of the die serrations as best shown in FIG. 9. The volume of the cavity in the die 70 is equal to that of the head 16. Thus as the die 70 is moved to contacting position with the holding die 58, the metal displaced by the punch 76 is back extruded to fill the cavity of the die 70, and the portion of the head 66 adjacent the die 50 is bloomed or upset to fill the recess 72 and form the flange 22. Thereafter, the die 70 may be retracted and the screw blank 10 knocked from the die 50 by a conventional knock-out pin 80 for transfer to a conventional roll threading apparatus wherein threads may be rolled on the shank portion 12.

The method of the invention presents several advantages. First, by utilizing an initial workpiece of the head diameter and extruding a shank therefrom a head part is obtained that is substantially unworked and, hence, can easily be extruded to form the external serrations and punched so as to form the socket of the screw. Moreover, as pointed out in my prior application, supra, the use of the round curved bottom extrusion die 30 enables the inexpensive provision of a workpiece having a relatively large head with respect to the shank and wherein the head is substantially unworked so that the further work steps thereon may be performed without difficulty. Still another advantage resides in the fact that by the extrusion thereof, relatively sharp points are formed on the serrations and which would be difficult to obtain by upsetting and expensive by any machining process. The successive steps of extruding the external serrations and punching the recess without removing the workpiece from the holding die assures accurate alignment of the workpiece and eliminates what would be a very difficult indexing problem if the workpiece were moved between steps.

Having illustrated and described a preferred embodiment of the invention, it should be apparent to those skilled in the art that the invention permits of modification in arrangement and detail. I claim as my invention all such modifications as come within the true spirit and scope of the appended claims.

I claim:

1. The method of forming a headed article having a tool receiving socket in the head thereof, axially extending wrench engaging serrations on the exterior surface of the head thereof, and a washer flange around the base of the head, said method comprising:
    (a) extruding a cylindrical workpiece while supporting the sides of said workpiece against lateral deformation to form a reduced shank portion and an unworked head part,
    (b) placing said shank portion in a holding die,
    (c) applying endwise over said head part an extruding pressure to extrude the same and form wrench engaging serrations thereon having a crest diameter substantially equal to the diameter of said unworked head part and a length less than the length of said head part,
    (d) without moving said workpiece advancing into said head part a recess forming pressure area of substantially smaller transverse dimension than the root diameter of the extruded serrations on said head part while simultaneously supporting the outer sides of said head part throughout the entire serrated portion thereof against substantial lateral deformation,
    (e) continuing the application of said last mentioned pressure while closely supporting the outer surfaces of said serrations against deformation so as fully to form a wrench receiving recess extending coaxially into the end of said head part and to cause lateral outward flow of metal about the base of said head part and to form a washer flange having a surface facing away from said head part extending at right angles to the axis of said shank.

2. A method of cold forming a cap screw including a head having twelve wrench engaging serrations formed on the exterior surface thereof, a hexagonal tool receiving socket in the interior of said head thereof disposed in predetermined relation with respect to said serrations, a shank of small cross-section relative to said head, and a washer flange about the base of said head adjacent said shank, which method comprises the steps of
    (a) providing a cylindrical workpiece of a diameter equal to the crest diameter of the serrations of the head of said screw,
    (b) applying pressure to one and of said workpiece and forcing the opposite end of said workpiece through an extrusion die having an orifice of a predetermined diameter less than that of said workpiece to extrude a predetermined portion of said workpiece and form an elongated portion of reduced cross-sectional size substantially equal in diameter to that of said shank,
    (c) supporting against deformation the sides of the workpiece throughout the full extent thereof while applying said pressure so that the workpiece retains a substantially unworked head portion of substantially the initial diameter of said workpiece, thereafter firmly supporting said workpiece by said shank portion,
    (d) advancing over said substantially unworked workpiece head portion an extrusion pressure applied to the outer side walls thereof so as to form a series of twelve wrench serrations extending longitudinally of said head of substantially the same diameter between crests of said serrations as the diameter of said head portion and of lesser diameter between the roots of said serrations than the diameter of said head portion, (e) the length of said serrations being less than the length of said head portion, (f) thereafter without removing said workpiece from said shank support, advancing upon said head a supporting die having a cavity provided with serrations mating with those formed in said workpiece by said extrusion pressure and while the outer surfaces of said serrations are thus supported against substantial lateral deformation, advancing a recess forming pressure over a hexagonal area of the end surface of said workpiece so as to form a hexagonal wrench receiving recess in the end of said head, (g) continuing the application of said last mentioned pressure while closely supporting the outer surfaces of said serrations against deformation so as fully to form a wrench receiving recess extending coaxially into the end of said head part and to cause lateral outward flow of metal about the base of said head part and to form a washer flange having a surface facing away from said head part extending at right angles to the axis of said shank.

References Cited in the file of this patent

UNITED STATES PATENTS

| | | |
|---|---|---|
| 976,758 | Warwick | Nov. 22, 1910 |
| 1,885,288 | Pracny | Nov. 1, 1932 |
| 2,133,466 | Purtell | Oct. 18, 1938 |
| 2,182,922 | Heschel | Dec. 12, 1939 |
| 2,353,531 | Whitney | July 11, 1944 |
| 2,814,059 | Lehning | Nov. 26, 1957 |

FOREIGN PATENTS

| | | |
|---|---|---|
| 735,243 | Germany | May 10, 1943 |